United States Patent Office 3,655,713
Patented Apr. 11, 1972

3,655,713
SILACYCLOPENTANE THIOLS AND THIOLATES
Gary E. Le Grow, Midland, Mich., assignor to Dow Corning Corporation, Midland, Mich.
No Drawing. Filed July 13, 1970, Ser. No. 54,582
Int. Cl. C07f 7/10, 7/18
U.S. Cl. 260—448.2 N                    10 Claims

ABSTRACT OF THE DISCLOSURE

Silacyclopentane mercaptans and thiolates of the formula

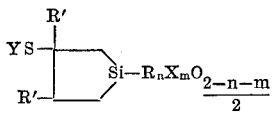

in which Y is hydrogen or an acyl group, $n$ is 0 or 1, $m$ is 0 to 2, are prepared by the addition of $H_2S$ or acyl-SH to the corresponding silacyclopentene in the presence of free radical generators such as peroxides, azo-bis-nitriles or ultraviolet light. Specific compounds where Z is

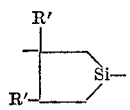

are $HSZ(CH_3)Cl$, $\{CH_3COSZ(CH_3)\}_2O$ and $(HSZO)_n$. The novel compounds are useful as lubricants, lubricant additives, and chemical intermediates.

---

The compositions of this invention have various uses. The mercaptans shown herein are useful as lubrication additives for petroleum oils or other lubricants and as intermediates in the preparation of organo-functional compounds containing other functions such as the carboxyl. For example, one can add acrylic acid to a mercaptan of this invention to produce a compound having a carboxyl and a sulfur atom attached to the cyclopentane ring. Such derivatives are useful as adhesion promoters in silicone rubber.

The thiolates employed herein are useful as intermediates in the preparation of the mercaptans.

This invention relates to an organosilicon compound of the formula

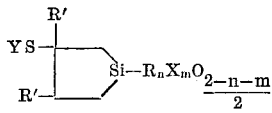

in which Y is H or Y'C=O in which Y' is a hydrocarbon or halohydrocarbon radical free of aliphatic unsaturation, R' is independently hydrogen or an alkyl radical of from 1 to 6 carbon atoms, R is a monovalent hydrocarbon radical or a monovalent halohydrocarbon radical, X is halogen, alkoxy, ketoxime, carboxyacyl, amineoxy or OH, R and X being free of aliphatic unsaturation, $n$ is 0 or 1 and $m$ is an integer from 0 to 2, the sum of $n+m$ being no greater than two.

This invention further relates to copolymeric siloxanes containing at least one unit of the formula

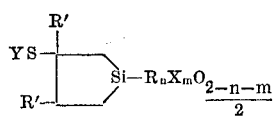

in which $n$, and $m$ are each 0 or 1 and Y, R', R and X are as above defined, the remaining siloxane units in said copolymer being essentially all of the formula

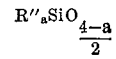

in which R" is a monovalent hydrocarbon or monovalent halohydrocarbon radical, or an X group and $a$ has a value from 0 to 3 inclusive.

As can be seen the compositions of this invention can be either silanes or siloxanes and the siloxanes can be either homopolymers or copolymers.

The thiolates of this invention are best prepared by adding thiolates of the structure Y'SH to

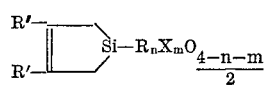

where R, $n$, X and $m$ are as above defined.

Where R' is an aliphatic radical the best procedure is to react the thiolate with the silacyclopentene at about 50° C. with any free radical initiator such as benzoyl peroxide or azo-bis-iso-butyronitrile. Where Y' is aromatic, however, the best method is to initiate the reaction with ultraviolet light at a wave length of about 2537 angstroms or shorter wave lengths, under ambient conditions.

The mercaptans of this invention can be prepared by two methods. The most general method is that of adding hydrogen sulfide to the corresponding silacyclosilapentene. This method works with all silanes and all of the siloxanes. The best conditions for carrying out the reaction is to use a large excess of hydrogen sulfide and react it with the silacyclopentene in the presence of ultraviolet light at temperatures of −20° C. or below. The excess of hydrogen sulfide should be at least 10 mols of hydrogen sulfide per mol of olefin.

The second method of preparing the mercaptans is that of reacting the corresponding thiolates with ammonia. This reaction operates with all siloxanes and with those silanes in which X does not produce an acidic byproduct upon hydrolysis. That is, X cannot be chlorine, acetoxy, etc. The ammonolysis is best carried out by reaction with ammonia in a protonated solvent such as methanol. The reaction goes quite well at room temperature.

Finally, the siloxanes particularly those containing

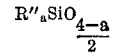

units can be prepared by any of the methods normally used to prepare siloxanes. These include cohydrolysis of the corresponding silanes and the reaction of silanes and siloxanes containing SiX groups with siloxanes containing SiOH groups. All of these reactions are well known in the art.

The starting materials for the preparation of the compositions of this invention are known compounds and are described and claimed in U.S. Patent 3,509,191. Briefly, these silacyclopentenes are prepared by reacting butadiene or derivatives of butadiene with disilanes as disclosed in said patent, the entire disclosure of which is hereby incorporated by reference.

Illustrative structure of the compositions of this invention are shown herein where Z is the structure

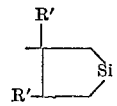

Thus, the mercaptans of this invention can be siloxanes of the generic formula $$HSZR_nX_mO_{\frac{2-n-m}{2}}$$

or silanes of the generic formula 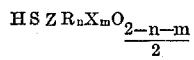. Specific structures for the mercaptans can be $HSZRX$, $HSZX_2$, $HSZRO_{.5}$, $HSZXO_{.5}$ and $HSZO$. Mercaptan copolymers can be a combination of units of the formulae $HSZRO_{.5}$ and

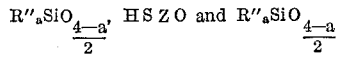

and combinations of $HSZRO_{.5}$,

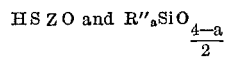

The homopolymers and copolymers can be any combination of the units $HSZRO_{.5}$, $HSZO$ and $HSZXO_{.5}$ in which R, X and Z can be the same or different groups. Z, of course, can vary by using various combinations of R'.

The thiolates of this invention can be of the generic formula $$Y'SZR_nX_mO_{\frac{2-n-m}{2}} \text{ or } Y'SZR_nX_m$$

These formulae include silanes of the structures $Y'SZRX$, $Y'SZX_2$ and siloxanes of the unit formulae $Y'SZRO_{.5}$, $Y'SZXO_{.5}$ and $Y'SZO$. The homopolymeric and copolymeric thiolate siloxanes can be any combination of units of the type $Y'SZRO_{.5}$, $Y'SZXO_{.5}$ and $Y'SZO$. The copolymers can vary with respect to the various types and combinations of Y', R', X and Z. One can also have copolymers of any combination of

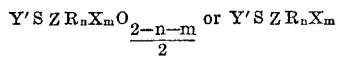

and units of any combination of the formula

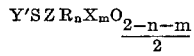

For the purpose of this invention Y' can be any monovalent hydrocarbon radical free of aliphatic unsaturation such as alkyl radicals such as methyl, ethyl, isopropyl, octadecyl or myricyl; cycloaliphatic hydrocarbon radicals such as cyclopentyl, cyclohexyl or methylcyclohexyl, aryl hydrocarbon radicals such as phenyl, xenyl, tolyl, xylyl, naphthyl or anthracyl and aralkyl hydrocarbon radicals such as benzyl, 2-phenylethyl, 2-phenylpropyl.

Also for the purpose of this invention Y' can be any halogenated monovalent hydrocarbon radical free of aliphatic unsaturation such as haloalkyl radicals such as chloromethyl, 3-chloropropyl, bromooctadecyl, 3,3,3-trichloropropyl, chloroisopropyl of 2(perfluoroalkyl)ethyl radicals in which the perfluoroalkyl radical is trifluoromethyl, perfluoroethyl, perfluoroisobutyl or perfluorooctadecyl; halocycloalkyl radicals such as bromocyclohexyl, chlorocyclopentyl or fluorocyclohexyl, haloaryl radicals such as 2,4-dichlorophenyl, dibromoxenyl, α,α,α-trifluorotolyl, iodonaphthyl and tetrachlorophenyl and haloaralkyl radicals such as 2(chlorophenyl)ethyl, p-chlorobenzyl or 2(bromophenyl)propyl.

R' can be hydrogen or any alkyl radical of from 1 to 6 carbon atoms such as methyl, ethyl, butyl, hexyl or isopropyl.

R can be any monovalent hydrocarbon radical free of aliphatic unsaturation such as alkyl radicals such as methyl, ethyl, isopropyl, octadecyl or myricyl; cycloaliphatic hydrocarbon radicals such as cyclopentyl, cyclohexyl or methylcyclohexyl; aryl hydrocarbon radicals such as phenyl, xenyl, tolyl, xylyl, naphthyl or anthracyl and aralkyl hydrocarbon radicals such as benzyl, 2-phenylethyl, or 2-phenylpropyl.

X can be any of the following groups which are free of aliphatic unsaturation. Halogen such as fluorine, chlorine, bromine or iodine; alkoxy groups such as methoxy, ethoxy, isopropoxy, octadecyloxy, cyclohexyloxy, phenoxy, benzoyloxy, β-phenylethyloxy, 2-chloroethyloxy, chlorophenoxy, 3,3,3-trifluoropropoxy or bromocyclohexoxy; or 2-methoxyethyl, 2-methoxyisopropyl, 2-butoxyisobutyl, p-methoxyphenyl or $-(CH_2CH_2O)_2CH_3$; any carboxy acyl radical such as acetyl, propionyl, benzoyl, cyclohexoyl, stearoyl, naphthoyl, trifluoroacetyl, chlorobenzoyl, or bromopropyl; or any aminoxy radical of the formula OB in which B is, for example, dimethylamino, diethylamino, ethylmethylamino, diphenylamino or dicyclohexylamino, or any ketoxime radical of the formula

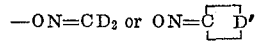

in which D is a monovalent hydrocarbon radical such as methyl, phenyl, allyl, octadecyl, cyclohexyl, or benzyl and D' is a divalent hydrocarbon radical such as pentamethylene, hexamethylene or 2-methyl pentamethylene.

For the purpose of this invention R" can be any monovalent hydrocarbon radical such as alkyl radicals such as methyl, ethyl, isopropyl, hexyl, octadecyl or myricyl; alkenyl radicals such as vinyl, allyl, hexenyl; alkynyl radicals such as propargyl; cycloaliphatic radicals such as cyclopentyl, cyclohexyl or cyclohexenyl; aromatic hydrocarbon radicals such as phenyl, tolyl, xylyl, xenyl, naphthyl or anthracyl and aralkyl hydrocarbon radicals such as benzyl, β-phenylethyl, β-phenylpropyl or gamma-tolylpropyl. In addition, R" can be any of the radicals shown for X above.

In those cases where R" contains aliphatic unsaturation and Y is H it is best to stabilize the compounds with free radical scavengers such as hydroquinone.

The following examples are illustrative only and should not be construed as limiting the invention which is properly delineated in the appended claims.

EXAMPLE 1

64.6 g. of thiolacetic acid containing a catalytic amount of azo-bis-isobutyronitrile was added to 128.0 g. of 1,1-dichloro-1-silylcyclopentene-3 with stirring over a period of 90 minutes as the flask was heated at 50° C. There was an exotherm to 80° C. during the reaction. The temperature was maintained at 50° C. by the rate of addition and by cooling. The reaction was stripped and the residue was shown by nuclear magnetic resonance to be of the formula

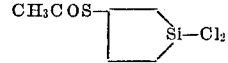

EXAMPLE 2

The product of Example 1 was added to 190 g. of refluxing methylorthoformate over a period of 2 hours. 1 g. of methanol was added and the entire mixture was allowed to reflux for one hour. The product was stripped at reduced pressure for one hour leaving 166.5 g. of 3-acetylthio-1,1-dimethoxy-1-silacyclopentane. This is a 89% yield. The material had the formula of

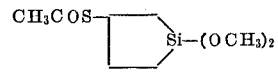

The structure was proven by nuclear magnetic resonance spectra.

EXAMPLE 3

Ammonia was blown into a stirred solution of 166.5 g. of 3-acetylthio-1,1-dimethoxy-1-silacyclopentane in 31 g. of methanol at a temperature of 60° C. for one hour. The methanol was stripped off and there was obtained acetamide and the product

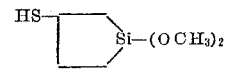

having the following properties: B.P. 54° C. at .1 mm. $n_D^{25}$ 1.4768, $d_4^{25}$ 1.0545, $R_D$ observed .2677 and $R_D$ calculated .2687. The structure of the compound was further certied by nuclear magnetic resonance spectra.

EXAMPLE 4

Employing the procedure of Example 1, 1-chloro-1-methyl-1-silacyclopentene-3, was reacted with thiolacetic acid to produce a mixture of the cis and trans isomers of the formula

having the following properties: $n_D^{25}$ 1.5047, B.P. 63° C. at 1.5 mm. The structures were verified by nuclear magnetic resonance spectra.

EXAMPLE 5

Employing the procedure of Example 2, the product of Example 4 was reacted with methanol to produce a mixture of the cis and trans isomers of the formula

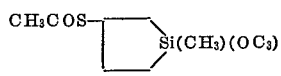

the structures of which were proven by nuclear magnetic resonance spectra.

EXAMPLE 6

Employing the procedure of Example 3 the product of Example 5 was reacted with ammonia in methanol to give a mixture of the cis and trans isomers of the formula

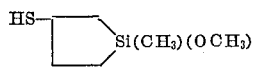

having the following properties: B.P. at 31° C. at .1 mm., $n_D^{25}$ 1.4842, $d_4^{25}$ 1.0093, $R_D$ observed .2837, calculated .2834. The structures were further identified by nuclear magnetic resonance.

EXAMPLE 7

16.2 g. of the product of Example 6 was mixed with 127 g. of HO(MeSiO)$_{34}$H and 1.4 g. of an acid clay sold under the name FILTROL 13 LM and stirred at 80° to 85° C. for 6 hours. The methanol was then removed at room temperature at .1 mm. for 2 hours to give 119.2 g. of the copolymer

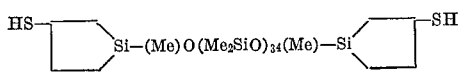

having a mercaptan equivalent of 1366 (theory equals 1397) and having the following properties: $n_D^{25}$ 1.4134 and a viscosity at 25° C. of 50 cps.

EXAMPLE 8

To 46.5 g. of 1-methyl-1-chloro-1-silacyclopentene-3 in a doubled walled quartz reactor was added 100 g. of liquid H$_2$S. The solution was stirred at −70° C. and irradiated with a one watt ultraviolet lamp (2537 A.) for 8 hours. The mixture was warmed to room temperature. After the excess H$_2$S had escaped there remained the product 1 - methyl-1-chloro-1-silacyclopentane-3-thiol B.P. 96° C. at 24 mm.

EXAMPLE 9

A solution of 210 g. of

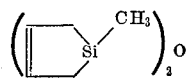

and 152 g. of thiolacetic acid containing 1 g. of azobisisobutyronitrile was irradiated with a heat lamp for two hours and then stirred at room temperature for 6 days. The mixture was distilled to give 300 g. of

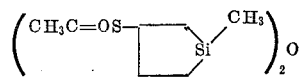

B.P. 120° C. at 0.1 mm., $n_D^{25}$ 1.5175 and $d_4^{25}$ 1.105.

EXAMPLE 10

300 g. of the product of Example 9 was suspended in 150 g. of water and 150 g. of methanol and ammonia gas was added with rapid stirring. After complete conversion of the ester to thiol, the organic layer was washed with water and dried with anhydrous sodium sulfate. Distillation gave 210 g. of

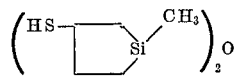

B.P. 110° C. at 0.2 mm., $n_D^{25}$=1.5200, $d_4^{25}$ 1.080.

EXAMPLE 11

27.8 g. of the product of Example 10, 10 g. of 52% HF in H$_2$O and 50 ml. of ethanol were refluxed for 18 hours then cooled. The organic products were extracted with 100 ml. of pentane. The pentane layer was washed with water and dried over anhydrous sulfate. Distillation gave 27.0 g. of

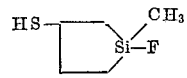

B.P. 162° C. at 760 mm., $n_D^{25}$=1.4700 and $d_4^{25}$=1.050.

EXAMPLE 12

When the following thiolates are added to the following silacyclopentanes under the influence of ultraviolet light of 2537 angstrom wave length. The following products are obtained.

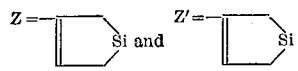

in this and the following examples.

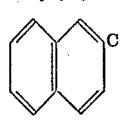

| Thiolate | Silacyclopentane | Product |
|---|---|---|
| C$_6$H$_5$COSH | Z(OC$_2$H$_5$)$_2$ | C$_6$H$_5$COSZ'(OC$_2$H$_5$)$_2$ |
| C$_6$H$_5$C$_6$H$_4$COSH | Z(C$_6$H$_5$)F | C$_6$H$_5$C$_6$H$_4$COSZ'(C$_6$H$_5$)F |
| CH$_3$C$_6$H$_4$COSH | Z(C$_{18}$H$_{37}$)(OCH$_3$) | CH$_3$C$_6$H$_4$COSZ'(C$_{18}$H$_{37}$)(OCH$_3$) |
| (naphthyl)COSH | Z(OOCCH$_3$)$_2$ | (naphthyl)COSZ'(OOCCH$_3$)$_2$ |
| (CH$_3$)$_2$C$_6$H$_3$COSH | (ZO)$_n$ | [(CH$_3$)$_2$C$_6$H$_3$COSZ'O]$_n$ |

EXAMPLE 13

When the following thiolates are added to the following silacyclopentenes in accordance with the procedure of Example 1, the following products are obtained.

| Thiolate | Silacyclopentene | Product |
|---|---|---|
| $C_{17}H_{35}COSH$ | $Z\{ON=C(C_2H_5)(CH_3)\}_2$ | $C_{17}H_{35}COSZ'\{ON=C(C_2H_5)(CH_3)\}_2$ |
| $C_6H_{11}COSH$ | $Z\{ON(CH_3)_2\}_2$ | $C_6H_{11}COSZ'\{ON(CH_3)_2\}_2$ |
| $C_6H_5CH_2CH_2COSH$ | $Z(C_6H_4Cl)O_{.5}$ | $C_6H_5CH_2CH_2COSZ'(C_6H_4Cl)O_{.5}$ |
| $CH_3COSH$ | 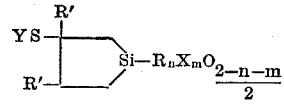 | 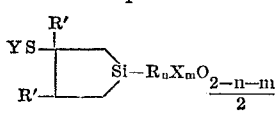 |

EXAMPLE 14

When the following silacyclopentenes are added to a ten-fold excess of liquid $H_2S$ and irradiated with ultra violet light the following products are obtained.

| Silacyclopentene | Product |
|---|---|
| $Z(CH_3)(OOCC_{17}H_{35})$ | $HSZ'(CH_3)(OOCC_{17}H_{35})$ |
| $Z(C_6H_5)(OCH_3)$ | $HSZ'(C_6H_5)(OCH_3)$ |
| $Z(C_6H_4C_6H_5)OH$ | $HSZ'(C_6H_4C_6H_5)OH$ |
| $Z(C_{18}H_{37})(OCH_2CH_2OCH_3)$ | $HSZ'(C_{18}H_{37})(OCH_2CH_2OCH_3)$ |
| $Z\{(CH_2)_3Cl\}Br$ | $HSZ'\{(CH_2)_3Cl\}Br$ |
| $Z(CH_2CH_2CF_3)(OC_2H_5)$ | $HSZ'(CH_2CH_2CF_3)(OC_2H_5)$ |
| $Z(C_6H_4Cl)\{ON(CH_3)_2\}$ | $HSZ'(C_6H_4Cl)\{ON(CH_3)_2\}$ |
| $(ZO)_n$ | $(HSZ'O)_n$ |
| $\{Z(CH_3)O\}_4Si$ | $\{HSZ'(CH_3)O\}_4Si$ |
| $(C_6H_5)(CH_3)_2SiO(ZO)_2Si(CH_3)_2C_6H_5$ | $(C_6H_5)(CH_3)_2Si\left(\underset{OZ'}{\overset{HS}{|}}\right)_2OSi(CH_3)_2(C_6H_5)$ |

EXAMPLE 15

When $CH_3COSZ'(OCH_3)_2$ is cohydrolyzed and cocondensed with the following silanes in the presence of FILTROL 13 LM the following products are obtained.

| Silanes mol percent | Product mol percent |
|---|---|
| 10% $CH_3COSZ'(OCH_3)_2$ | 10% $CH_3COSZ'O$ |
| 20% $(CH_3)_2Si(OCH_3)_2$ | 20% $(CH_3)_2SiO$ |
| 20% $CH_3Si(OCH_3)_2Cl$ | 20% $CH_3SiO_{1.5}$ |
| 20% $C_2H_5Si(OCH_3)_3$ | 20% $C_2H_5SiO_{1.5}$ |
| 30% $C_6H_5Si(OCH_3)_3$ | 30% $C_6H_5SiO_{1.5}$ |
| 50% $CH_3COSZ'(OCH_3)_2$ | 50% $CH_3COZ'O$ |
| 50% $C_6H_5(CH_3)Si(OCH_3)_2$ | 50% $C_6H_5(CH_3)SiO$ |
| 45% $CH_3COSZ'(OCH_3)_2$ | 45% $CH_3COSZ'O$ |
| 45% $CF_3CH_2CH_2Si(CH_3)(OCH_3)_2$ | 45% $CF_3CH_2CH_2Si(CH_3)O$ |
| 10% $(CH_3)_3SiCl$ | 10% $(CH_3)_3SiO_{.5}$ |

EXAMPLE 16

When (1) $HSZ'(CH_3)Cl$ or (2) $HSZ'Cl_2$ are cohydrolyzed and cocondensed with the following silanes the following products are obtained.

| Silane mol percent | Product mol product |
|---|---|
| 10% (1) | 10% $HSZ'(CH_3)O_{.5}$ |
| 10% $(CH_3)_2SiCl_2$ | 20% $(CH_3)_2SiO$ |
| 20% $CH_3Si(OCH_3)_2Cl$ | 20% $CH_3SiO_{1.5}$ |
| 20% $C_6H_5SiCl_3$ | 20% $C_6H_5SiO_{1.5}$ |
| 20% $C_2H_5SiCl_3$ | 20% $C_2H_5SiO_{1.5}$ |
| 20% $(C_6H_5)_2SiCl_2$ | 10% $(C_6H_5)_2SiO$ |
| 20% (2) | 20% $HSZ'O$ |
| 20% $ClC_6H_4SiCl_3$ | 20% $ClC_6H_4SiO_{1.5}$ |
| 20% $(CF_3CH_2CH_2)(CH_3)SiCl_2$ | 20% $CF_3CH_2CH_2Si(CH_3)O$ |
| 20% $C_6H_5CH(CH_3)CH_2Si(CH_3)Cl_2$ | 20% $C_6H_5CH(CH_3)CH_2Si(CH_3)Cl_2$ |
| 10% $C_{18}H_{37}SiCl_3$ | 10% $C_{18}H_{37}SiO_{1.5}$ |
| 10% $(CH_3)_3SiCl$ | 10% $(CH_3)_3SiO_{.5}$ |

That which is claimed is:

1. An organosilicon compound of the formula $$YS-\overset{R'}{\underset{R'}{|}}\boxed{\phantom{xx}}Si-R_nX_mO_{\frac{2-n-m}{2}}$$

in which

Y is hydrogen or Y'CO in which
Y' is a monovalent hydrocarbon or halohydrocarbon radical free of aliphatic unsaturation, Y' containing from 1 to 30 carbon atoms, R' is independently hydrogen or an alkyl radical of from 1 to 6 carbon atoms,
R is a monovalent hydrocarbon radical or a monovalent halohydrocarbon radical containing from 1 to 30 carbon atoms,
X is halogen, hydroxyl or alkoxy, ketoxime, carboxyacyl or amineoxy, containing from 1 to 18 carbon atoms,
R and X being free of aliphatic unsaturation,
$n$ is 0 or 1, and
$m$ is 0 to 2, the sum of
$n + m$ being not greater than two.

2. A copolymeric siloxane containing at least one unit of the formula $$YS-\overset{R'}{\underset{R'}{|}}\boxed{\phantom{xx}}Si-R_nX_mO_{\frac{2-n-m}{2}}$$

in which $n$ and $m$ are each 0 or 1,
Y is hydrogen or Y'C=O in which
Y' is hydrocarbon or halohydrocarbon radicals free of aliphatic unsaturation, Y' containing from 1 to 30 carbon atoms,
R' is independently hydrogen or an alkyl radical of 1 to 6 carbon atoms,
R is a monovalent hydrocarbon radical or a monovalent halohydrocarbon radical of from 1 to 30 carbon atoms,
X is halogen, hydroxyl or alkoxy, ketoxime, carboxyacyl or amineoxy, of 1 to 18 carbon atoms,
R and X being free of aliphatic unsaturation, the remaining siloxane units in said copolymer being essentially all of the formula $$R''_a SiO_{\frac{4-a}{2}}$$

in which
R'' is a monovalent hydrocarbon radical or a monovalent halohydrocarbon radical of from 1 to 30 carbon atoms or an X group and $a$ has a value from 0 to 3.

3. A composition of claim 1 in which Y and each R' are hydrogen.

4. The composition of claim 3 in which R is methyl and $m$ is 0.

5. The composition of claim 3 in which R is methyl and X is chlorine.

6. The composition of claim 3 in which $n$ is 0, X is methoxy and $m$ is 2.

7. The composition of claim 1 in which Y is Y'CO.

8. The composition of claim 2 where Y and each R' is hydrogen.

9. The composition of claim 8 in which R is methyl, $m$ is 0 and R'' is methyl.

10. The composition of claim 9 in which $a$ is 2.

References Cited
UNITED STATES PATENTS

| 2,544,296 | 3/1951  | Burkhard | 260—448.2 N |
| 2,802,853 | 8/1957  | George   | 260—448.2 N |
| 2,863,898 | 12/1958 | Merker   | 260—448.2 N |
| 3,445,496 | 5/1969  | Ryan     | 260—448.8 R |

TOBIAS E. LEVOW, Primary Examiner

P. F. SHAVER, Assistant Examiner

U.S. Cl. X.R.

204—158 R, 159.13; 252—49.6; 260—46.5 E, 46.5 P, 46.5 Y, 399, 402.5, 448.2 B, 448.2 D, 448.2 E, 448.8 R